United States Patent
San Martin et al.

(10) Patent No.: US 10,677,954 B2
(45) Date of Patent: Jun. 9, 2020

(54) METHOD AND ARTICLE FOR EVALUATING MUD EFFECT IN IMAGING TOOL MEASUREMENT

(71) Applicant: Halliburton Energy Services, Inc., Houston, TX (US)

(72) Inventors: Luis Emilio San Martin, Houston, TX (US); Hsu-Hsiang Wu, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 58 days.

(21) Appl. No.: 15/742,752

(22) PCT Filed: Aug. 17, 2015

(86) PCT No.: PCT/US2015/045491
§ 371 (c)(1),
(2) Date: Jan. 8, 2018

(87) PCT Pub. No.: WO2017/030549
PCT Pub. Date: Feb. 23, 2017

(65) Prior Publication Data
US 2018/0203150 A1    Jul. 19, 2018

(51) Int. Cl.
*G01V 3/20* (2006.01)
*G01V 3/18* (2006.01)
(Continued)

(52) U.S. Cl.
CPC ............. *G01V 3/20* (2013.01); *G01V 3/18* (2013.01); *G01V 3/34* (2013.01); *G01V 99/005* (2013.01)

(58) Field of Classification Search
CPC ............... G01V 3/20; G01V 3/34; G01V 3/18
(Continued)

(56) References Cited

U.S. PATENT DOCUMENTS

| 2,155,133 A | * | 4/1939 | Jakosky | G01V 3/20 324/355 |
| 4,468,623 A | * | 8/1984 | Gianzero | G01V 3/20 324/367 |

(Continued)

OTHER PUBLICATIONS

"International Application Serial No. PCT/US2015/045491, International Search Report dated May 3, 2016", 4 pages.

(Continued)

*Primary Examiner* — Christopher P McAndrew
(74) *Attorney, Agent, or Firm* — Gilliam IP PLLC

(57) ABSTRACT

Method and articles for evaluating mud effect in imaging tool measurements are described. In an example, the method includes taking a plurality of measurements with a sensor positioned down a borehole, the sensor offset from a wall of the formation by a layer of mud, each measurement having an associated azimuth angle and depth. The plurality of measurements are related into a measurement set with each of the plurality of measurements having the same azimuth angle and depth within a designated depth range. The method includes determining, with a motion sensor, a relative position change of the sensor of each of the measurements within the measurement set and determining the offset of the sensor, one or more formation property, and one or more mud property.

22 Claims, 14 Drawing Sheets

(51) Int. Cl.
*G01V 3/34* (2006.01)
*G01V 99/00* (2009.01)

(58) Field of Classification Search
USPC ........................................................ 324/355
See application file for complete search history.

(56) References Cited

U.S. PATENT DOCUMENTS

| | | | | |
|---|---|---|---|---|
| 4,791,618 A * | 12/1988 | Pruchnik | ............... | E21B 47/026 367/25 |
| 5,397,893 A * | 3/1995 | Minette | ................... | E21B 47/00 250/254 |
| 5,767,680 A * | 6/1998 | Torres-Verdin | ....... | E21B 47/102 324/355 |
| 6,376,838 B1 * | 4/2002 | Odom | .................... | G01V 5/101 250/269.6 |
| 6,396,276 B1 * | 5/2002 | Van Steenwyk | ...... | E21B 47/122 175/50 |
| 6,594,584 B1 | 7/2003 | Omeragic et al. | | |
| 7,259,564 B2 * | 8/2007 | Ligneul | ................ | E21B 47/042 324/337 |
| 7,436,184 B2 * | 10/2008 | Moore | ..................... | G01V 3/24 166/66.5 |
| 7,545,145 B2 * | 6/2009 | Wang | ....................... | G01V 3/20 324/355 |
| 7,679,368 B2 * | 3/2010 | Folberth | .................. | G01V 3/24 324/355 |
| 8,030,937 B2 * | 10/2011 | Hu | ........................... | G01V 3/24 324/366 |
| 8,319,498 B2 * | 11/2012 | Wang | ....................... | G01V 3/24 324/366 |
| 8,330,466 B2 * | 12/2012 | Bloemenkamp | ......... | G01V 3/24 324/354 |
| 8,933,700 B2 * | 1/2015 | Hayman | .................. | G01V 3/24 324/347 |
| 9,400,339 B2 * | 7/2016 | Bloemenkamp | ......... | G01V 3/24 |
| 9,488,748 B2 * | 11/2016 | Bloemenkamp | ......... | G01V 3/20 |
| 9,513,399 B2 * | 12/2016 | Cheung | .................... | G01V 3/24 |
| 2002/0096363 A1 * | 7/2002 | Evans | .................... | E21B 47/00 175/41 |
| 2005/0150689 A1 * | 7/2005 | Jogi | ......................... | E21B 7/06 175/45 |
| 2006/0015257 A1 * | 1/2006 | Hassan | ................... | E21B 47/00 702/6 |
| 2007/0103161 A1 * | 5/2007 | San Martin | .............. | G01V 3/24 324/366 |
| 2007/0279063 A1 * | 12/2007 | Beard | ....................... | G01V 3/24 324/355 |
| 2008/0078242 A1 | 4/2008 | Hassan et al. | | |
| 2008/0272789 A1 * | 11/2008 | San Martin | ............... | G01V 3/24 324/355 |
| 2008/0275648 A1 * | 11/2008 | Illfelder | ................. | E21B 47/022 702/7 |
| 2008/0288171 A1 * | 11/2008 | Itskovich | .................. | G01V 3/20 702/7 |
| 2009/0043509 A1 | 2/2009 | Madigan et al. | | |
| 2009/0256575 A1 * | 10/2009 | Pisklak | ..................... | G01V 3/22 324/355 |
| 2010/0145621 A1 * | 6/2010 | Moake | ....................... | G01V 5/08 702/8 |
| 2011/0012015 A1 * | 1/2011 | Evans | ....................... | G01V 5/14 250/269.2 |
| 2011/0025336 A1 * | 2/2011 | Forgang | ................... | G01V 3/20 324/367 |
| 2011/0156710 A1 * | 6/2011 | Wang | | |
| 2011/0161009 A1 * | 6/2011 | Wang | ....................... | G01V 5/04 702/9 |
| 2011/0199090 A1 * | 8/2011 | Hayman | ................ | E21B 47/082 324/356 |
| 2011/0241690 A1 * | 10/2011 | Hayman | .................. | G01V 3/24 324/355 |
| 2012/0125077 A1 * | 5/2012 | Rodney | .................. | E21B 47/022 73/1.37 |
| 2012/0130693 A1 * | 5/2012 | Ertas | ....................... | E21B 44/00 703/2 |
| 2013/0030705 A1 | 1/2013 | Pei et al. | | |
| 2013/0215715 A1 * | 8/2013 | Hollstein | ................. | E21B 49/00 367/35 |
| 2013/0270008 A1 * | 10/2013 | DiGiovanni | ............. | E21B 47/00 175/40 |
| 2015/0012217 A1 * | 1/2015 | Legendre | .............. | E21B 47/082 702/7 |
| 2015/0218929 A1 * | 8/2015 | Narasimhan | ......... | G01V 11/002 175/45 |
| 2016/0252648 A1 * | 9/2016 | Omeragic | ................ | G01V 5/04 702/8 |

OTHER PUBLICATIONS

"International Application Serial No. PCT/US2015/045491, Written Opinion dated May 3, 2016", 5 pages.
CA Application Serial No. 2,991,566, Office Action, dated Oct. 1, 2018, 4 pages.
PCT Application Serial No. PCT/US2015/045491, International Preliminary Report on Patentability, dated Aug. 17, 2015, 4 pages.

* cited by examiner

METHOD AND ARTICLE FOR EVALUATING
MUD EFFECT IN IMAGING TOOL
MEASUREMENT

BACKGROUND

This disclosure generally relates to exploration and production of hydrocarbons involving investigations of regions of an earth formation penetrated by a borehole. More specifically, the disclosure relates to the accurate measurement and imaging of the resistivity of an earth formation using a logging tool in a borehole.

Generally, there are two categories of electrical logging apparatuses. In one category, one or more measurement electrodes, such as current sources or sinks, are used in conjunction with a return electrode. A measurement current flows in a circuit that connects a current source to the measurement electrode(s), through the earth formation to the return electrode, and back to the current source in the tool. In another category, electrical logging apparatuses include inductive measuring tools and an antenna, which are configured to induce a current flow within the earth formation.

Electrical logging devices may be operable in one or more modes. In one mode, a constant current is maintained at a measuring electrode while a voltage is measured; in another mode, the voltage of the measuring electrode is held constant and the current is measured. Ideally, if current is varied to maintain a constant voltage, the resultant current is inversely proportional to the resistivity of the earth formation being investigated. Conversely, if current is maintained constant through the circuit, ideally speaking the voltage of the measurement electrode is proportional to the resistivity of the earth formation being investigated. Ohm's law teaches that if both current and voltage vary, the resistivity of the earth formation is proportional to the ratio of the voltage to the current.

In real world applications, however, the aforementioned physical relationships are more complicated. Those of ordinary skill in the art will appreciate that there are usually other variables to consider, such as, for example, electrical characteristics of the instrumentation itself and electrical characteristics of the environment under consideration.

It is known that oil-based drilling fluids (e.g., muds) may be used when drilling through formations and an increasing number of present day exploration prospects use such techniques. The use of oil-based muds, which have a low conductivity relative to water-based muds, implicates a potential drawback in the use of contact electrodes to inject electrical currents into a wellbore. Any standoff or gap between an electrode and a wellbore creates a standoff impedance; and as electrode standoff increases, the corresponding impedance can begin at some point to dominate resistivity measurement taken through the electrode. Increasing rugosity which tends to increase average electrode standoff, thus becomes especially problematic.

DETAILED DESCRIPTION

Figure 1:
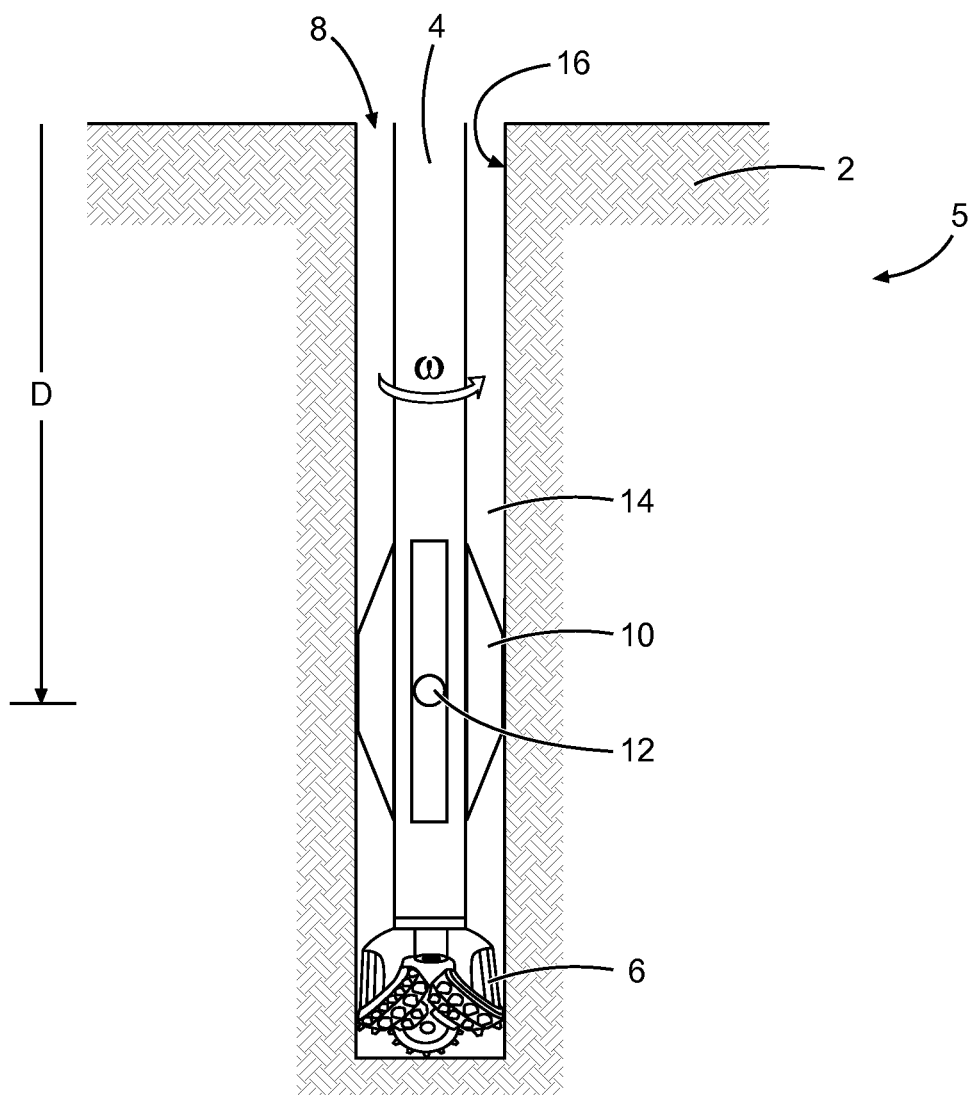
FIG. 1 illustrates a perspective view of a bottom hole assembly including an imaging tool, according to various embodiments.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Articles and methods are described, such as for evaluating mud effects in imaging tool measurement placed downhole in a bore drilled in a formation. For example, the imaging tool is an electromagnetic imaging tool having a sensor to measure voltage drop and current flow of a current originating at the sensor and into the formation. The phase and magnitude of the measurements can be used to estimate the resistivity of the formation and to generate an image of the surface of the borehole.

Oil-based mud (e.g., mud) is generally used in drilling operations. As such, a layer of mud exists in the standoff distance between the button and the surface of the formation. The sensor passes a current through the button, the layer of mud, and into the formation. The type of mud, conductivity of the mud, and the thickness of the mud layer between the button and the formation affects the imaging tool measurement. The following description provides one or more solutions to this problem, such as by providing an article and method for taking into account mud effects over a plurality of imaging tool measurements.

The method of evaluating mud effects as described herein may include compiling a plurality of measurements taken at different azimuthal positions and a similar axial position, such as within a range of axial positions. The method may be performed by imaging tool sensors positioned downhole in a borehole. Such imaging tool sensors can be provided as part of a wireline sonde or as part of a bottom hole assembly during measure-while-drilling (MWD) or log-while-drilling (LWD) operations. In one example, azimuthal measurements can be taken during LWD rotation operations. In other examples, azimuthal measurements can be acquired using wireline by installing multiple sensors at different azimuthal angles, rotating the wireline sonde to take measurements at different azimuthal angles, or vibrating the wireline sonde to take measurements at the same azimuthal angle but at different sensor positions relative to a borehole.

Azimuthal measurements are compiled as a measurement set, which may include differences in radial positions between different measurements in the set. Using the measurement set, the method of evaluating mud effects as described herein determines a thickness of the mud layer and models the imaging tool measurements to provide a model for solving both the formation parameters and the mud parameters, and thus evaluate the effect of mud on the measurements.

FIG. 1 illustrates a perspective view of a bottom hole assembly 5 including an imaging tool sensor 10, such as to support the evaluation of mud effects during LWD or MWD. As shown, the bottom hole assembly 5 includes a mandrel 4 placed in a borehole 8 formed in a formation 2. The mandrel 4 includes one or more drill bit 6 for forming the borehole 8. The mandrel 4 rotates or spins in the direction w within the formation 2 so as to form the borehole 8. Although the direction w is shown as counter-clockwise other directions are contemplated. As the mandrel 4 rotates, the imaging tool sensor 10, which is coupled to the mandrel 4, rotates about the borehole 8 along a formation surface 16. The imaging tool sensor 10 includes a button 12, such as an electrode, that provides a current through the formation surface 16 and a distance within the formation 2. As discussed herein, there is a standoff distance between the button 12 and the formation surface 16. Within the standoff distance there is a layer of mud 14 which the current passes through to reach the formation 2.

As discussed herein, as the imaging tool sensor 10 rotates about the borehole 8, a plurality of measurements are taken at multiple locations on the formation surface 16. Further, the rotation rate, ω, of the mandrel 4 is greater than the axial movement of the mandrel 4. That is, at a depth D the imaging tool sensor 10 takes a plurality of measurements at different azimuthal positions. The plurality of measurements at a common depth D are modeled, as discussed herein.

Figure 2:
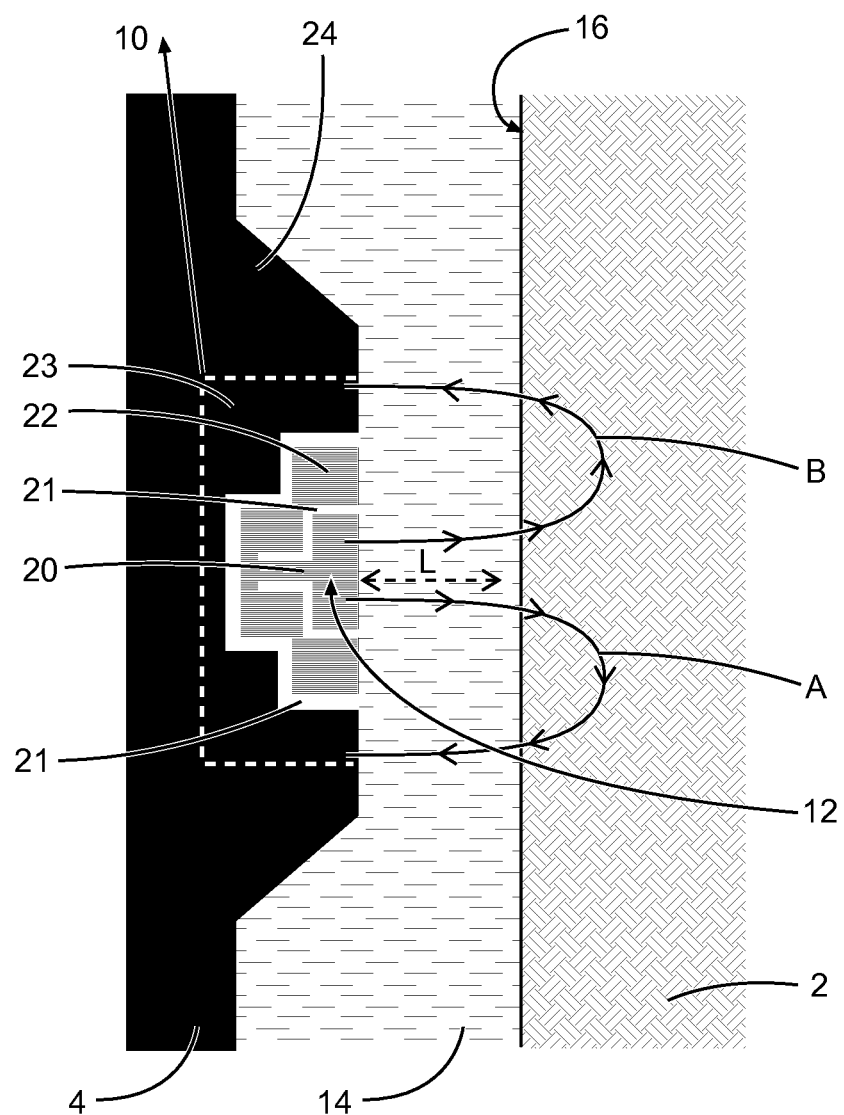
FIG. 2 illustrates a perspective view of a sensor of an imaging tool, according to various embodiments.

FIG. 2 illustrates a perspective view of an imaging tool sensor 10, according to various embodiments. As shown in FIG. 2, the imaging tool sensor 10 is located on the mandrel 4 that is positioned within the borehole 8. The imaging tool sensor 10 is located a standoff distance L from the formation surface 16. The volume between the imaging tool sensor 10 and the formation surface 16, which includes the standoff distance L, is at least partially filled with mud 14. As described herein, the standoff distance L is determined from an approximate center of the button 12 perpendicularly to the formation surface 16. That is, the button 12 is located on a protrusion 24 of the mandrel 4 which is closest to the formation surface 16.

In an example, the button 12 includes a center electrode 20 and a guard electrode 22. The center electrode 20 and the guard electrode 22 are surrounded by a return electrode 23. The guard electrode 22, in an example, focuses the current, indicated by arrows A and B, emitted by the center electrode 21 deeper into the formation 2. As described herein, the quality of the image produced and the accuracy of the measurements of the imaging tool sensor 10 are dependent on an accurate account of the effects of the mud layer 14 on the measurements. As shown, the flow of electrical currents A, B are from the center electrode 20 and are received, after passing through the mud layer 14 and the formation 2, at the return electrode 23. The center electrode 20, outer electrode 22, and return electrode 23 are, in an example, separated by an insulating material 21. In an example, the center electrode 20 is a circular electrode.

As described herein, the layer of mud 14 having a thickness L, for example a perpendicular distance from a center of the button to the formation surface 16, can be modeled as a capacitor. For example, the parallel capacitance and resistance of the mud layer with the button having an area A and the mud layer having a thickness L can be determined based on the permittivity (e.g., $\varepsilon_{mud}$) and resistivity ($\rho_{mud}$) of the mud, respectively. For example, equation (1) represents the capacitance $C_L$ of the mud layer and equation (2) represents the resistance $R_L$ of the mud layer.

$$C_L = \frac{\varepsilon_{mud} * A}{L} \tag{1}$$

$$R_L = \frac{\rho_{mud} * L}{A} \tag{2}$$

In an example, as the mandrel 4, and subsequently the logging tool sensor 10, rotates about the borehole 8 a plurality of measurements are taken with the imaging tool sensor 10 at multiple azimuthal locations on the formation surface 16 of the borehole 8 at a given depth. That is, the angular rotation speed of the imaging tool sensor is greater than the axial speed or drilling speed of the mandrel 4. As discussed herein, the plurality of measurements taken at different azimuthal positions but similar axial positions can be grouped into measurement sets.

Figure 3:
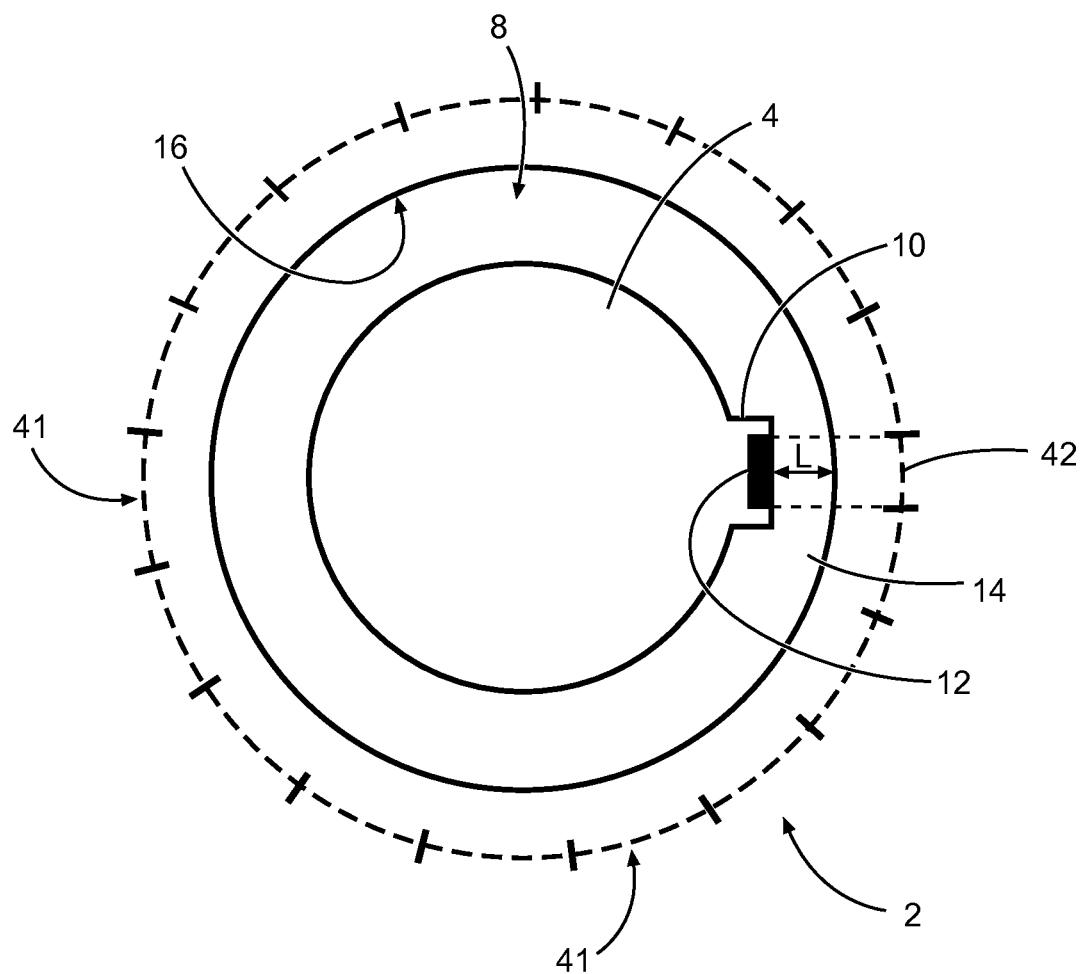
FIG. 3 illustrates a top-down cut-view of an imaging tool, according to various embodiments.

FIG. 3 illustrates a top-down cut-view of an imaging tool sensor 10, according to various embodiments. As shown in FIG. 3, the mandrel 4 is positioned within the borehole 8 formed in the formation 2. The imaging tool sensor 10 is positioned a standoff distance L from the formation surface 16, wherein the standoff distance L includes a layer of mud 14. As discussed herein, the standoff distance L is measured perpendicularly from the button 12 to the formation surface 16. In an example, distance L is substantially the same at a given depth D of the button 12. As the mandrel 4 rotates the button 12 measures the formation and mud properties in 360 degrees in the azimuthal position for a given axial position or depth of the bore hole 8. The imaging tool sensor 10 has a resolution which can be evaluated precisely through numerical modeling, and for the button 12 could be different in the axial and azimuthal directions. The resolution of the imaging tool sensor 10 is, in an example, approximately equal to a diameter of the center electrode (20, FIG. 2), which can vary. For example, the resolution of the imaging tool sensor 10, in various examples, is about 0.25 inches, about 0.5 inches, about 1.0 inch, about 1.5 inches, about 2.0 inches, about 3 inches, about 4 inches, or about 5 inches or greater.

Figure 4:
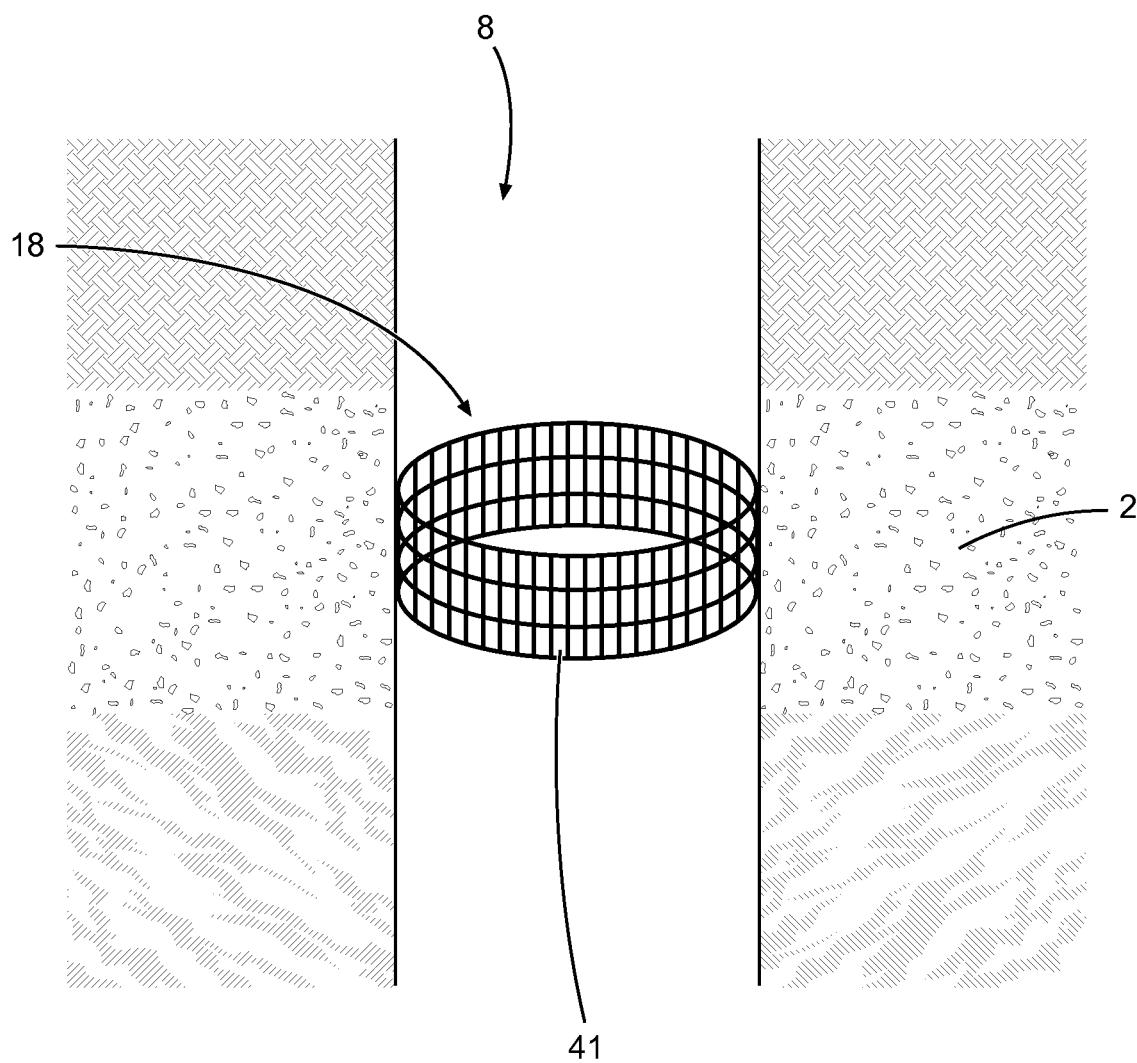
FIG. 4 illustrates a perspective view of a formation surface of a borehole segmented by a parametric mesh that divides the formation surface into a plurality of cells, according to various embodiments.

As shown in FIG. 4, in an example, measuring the formation surface 16 includes dividing the formation surface 16 by a parametric mesh 18 into cells 41, where the size of each of the cells 41 is approximately equal to the resolution of the imaging tool sensor 10 in the axial and azimuthal directions. As such, each of the cells 41 is identifiable by two indices, one for the axial position and one for the azimuthal position.

For example, as shown in FIG. 3, the top-down cut-view illustrates a plurality of cells 41 each having the same axial indicia (e.g., axial position or depth). As the mandrel 4 rotates, the imaging tool sensor 10 passes over the formation surface 16 and through the cells 41. In one or more examples, the rate of rotation of the mandrel 4 may vary from about 50 rotations per minute to about 200 rotations per minute. The axial rate (e.g., rate of penetration, drilling rate), in various examples, can be from about 0.25 inches per minute to about 5 inches per minute, but may vary based on at least the type of rock the formation 2 includes and the type of equipment used.

In an example, the mandrel 4 can rotate about 180 rotations per minute, thereby moving the button 12 (having a diameter of 1.0 inch), due to the azimuthal component of the velocity, at approximately 72 inches per second, and the penetration rate can be about 2 to 3 inches per minute, wherein the axial component of the velocity is approximately 0.055 inches per second (which may be considered small compared to the 72 inches per second displacement due to the rotational velocity of the mandrel). As the button has a diameter of 1.0 inch, each of the cells 41 has a size (e.g., both length and width dimensions) of 1.0 inch.

Generally, the number of times, $Num_R$, that imaging tool sensor 10 passes over in front of each of the cells 41 within a certain penetration distance d (inch) can be estimated by the equation:

$$Num_R = \frac{d}{V_p} \times V_r \quad (3)$$

Where $V_p$ is penetration rate (inch/min) and $V_r$ is rotation speed (RPM). In an example having 0.3" penetration distance, 3 inch/min penetration rate and 180 RPM rotation speed, the number of times that imaging tool sensor 10 passes over in front of each of the cells 41 is approximately 18 times before progressing to a different axial position (e.g., depth within the bore hole 8).

In an example, the logging tool sensor 10 has sensors that indicate the relative changes in the imaging tool position within the borehole 8. As such, the relative change in position, that is, from one position to the next, is obtainable and registered by the logging tool sensor 10. Further, the differences in position, such as axial position, between successive measurements at the same angular or azimuthal position are determinable. As discussed herein, the relative radial position change (e.g., radial displacement relative to the center of the borehole 8) between successive measurements is used to determine the thickness of the mud layer (e.g., standoff distance L). For example, at a given angular velocity of the imaging tool sensor 10 and the rate of penetration of the mandrel 4, a certain number of measurements are considered to be taken in front of approximately the same cell 42. In such an example, the set of measurements of the same cell, taken at slightly different distances (e.g., standoff distance L) from the formation surface 16 are used to estimate the effect of the mud layer 14 on the measurements and used to generate a correction, such as by modeling, for that mud effect. As referenced herein, the set of measurements, that is a plurality of measurements taken at substantially the same location of the borehole 8, is symbolized by the notation $\{Mi\}$ with i=1, . . . , N, with N being the number of measurements in the set.

In one or more examples, the plurality of measurements, including voltages, currents, and relative position changes, are registered for a given cell 41 position of the formation surface 16. For example, as shown in FIG. 3, the single cell 42 is associated with a plurality of measurements, such as 18 measurements in the example above, taken at that axial and azimuthal position of the single cell 42. Each of the plurality of measurements M taken at the single cell 42 has an azimuthal coordinate (e.g., $\phi$) and an axial coordinate (e.g., z-coordinate). By assigning a relative position ($\phi$, z) to each measurement M, the plurality of measurements taken at the single cell 42 is defined as a function of the azimuthal and axial position as $S(\phi, z) = \{M_1, M_2, \ldots, M_N\}$. The number N is the number of times the button 12 measured at the same single cell 42 of the formation surface 16. The number N, in an example, is obtained from the angular frequency of rotation and the rate of penetration of the tool, as described herein.

As described herein, for the purposes of simplification, it is assumed that the formation surface 16 of the borehole 8 is approximately flat. Assuming the formation surface 16 is a good approximation when, for example, the size (e.g., diameter) of the button 12 is small compared to the radius of the borehole 8. However, embodiments are not limited to such an assumption. In an example, methods, according to the present subject matter, include taking into consideration the curvature of the borehole 8 (e.g., formation surface 16), such as by numerical modeling. However, such a consideration will likely result in qualitatively similar results.

Figure 5:
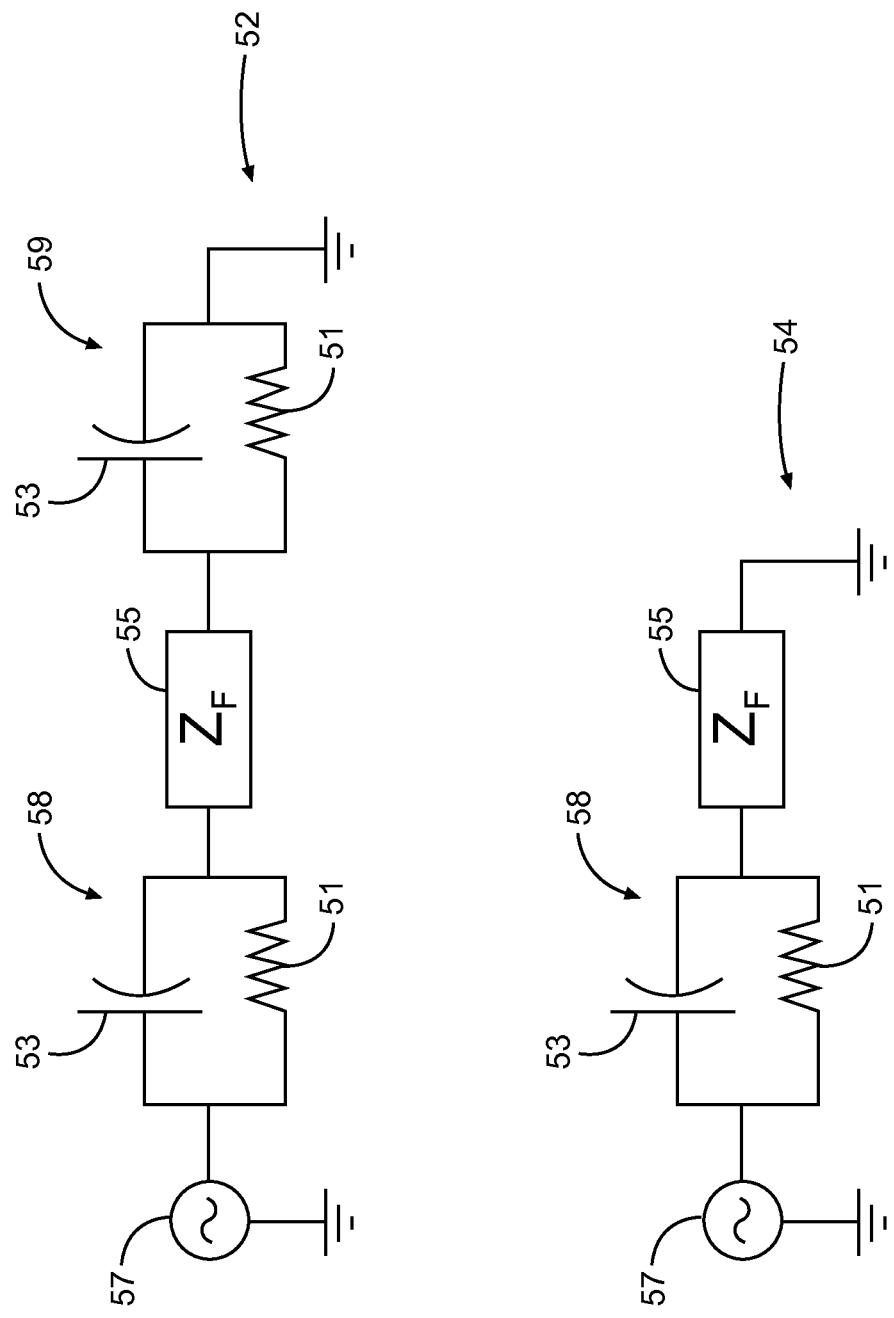
FIG. 5 illustrates model electrical circuits of an imaging tool, according to various embodiments.

FIG. 5 illustrates model electrical circuits 52, 54 of an imaging tool, according to various embodiments. The model electrical circuits 52, 54 illustrate an approximate circuit representation of an example wherein the mud layer (e.g., standoff distance) between the electrode (e.g., button) and the formation surface is modeled as a resistor 51 and a capacitor 53 in parallel, as described in relation to FIG. 2, connected to the formation impedance 55. As shown in FIG. 5, the model electrical circuit 52 includes a signal 57 (e.g., circular electrode) emitting a current through a first mud layer 58 represented as a resistor 51 and a capacitor 53 in parallel with the formation impedance ($Z_F$) 55 and a second mud layer 59, including a resistor 51 in parallel with a capacitor 53, wherein the second mud layer 59 represents the mud layer between the formation and the current return in the tool. The formation, in an example, is represented as complex impedance ($Z_F$) including the effect of the dielectric constant of the formation. In various examples, the purely resistive load is an approximation for the formation effect, but in some situations the dielectric constant is large enough to produce non-negligible reactive effect. The mud layer between the formation and the return in the tool can also be represented by complex impedance ($Z_L$), with a resistor and a capacitor in parallel, although the effect on the measurement is very small. In an example, a focused imaging tool, such as the imaging tool (e.g., circular electrode) described in the present subject matter, the bulk of the measurement is obtained in the focused region, before the currents flare and flow back to the return electrode(s). Accordingly, as shown in model electrical circuit 54, the impedance between the formation and the return electrode (the second mud layer 59) can be neglected, resulting in the first mud layer 58, including the resistor 51 in parallel with the capacitor 53 representing the impedance of the mud layer.

In an example, the measured impedance $Z_M$ is represented as the sum of the mud layer impedance $Z_L$ and the formation impedance $Z_F$, as shown by equation (4):

$$Z_M = Z_L + Z_F \tag{4}$$

Considering equation (1) for the capacitance C of the mud layer and equation (2) for the resistance R of the mud layer, as described herein, the impedance of the mud layer $Z_L$ is described by the following equations:

$$(Z_L)^{-1} = R_L^{-1} + j\omega C_L \Rightarrow Z_L = \frac{R_L}{1+\alpha^2} + j\frac{\alpha R_L}{1+\alpha^2} \tag{5}$$

Where, $\alpha = \omega R_L C_L$, which, using equations (1) and (2), can be rewritten independent of the layer thickness: $\alpha = \omega \rho_L \in_L$. Substituting the approximation for $R_L$ in (2) the resulting approximate measured impedance follows:

$$Z_M = AL + jBL + Z_F \tag{6}$$

As shown by equation (6), the measured impedance has linear dependence on thickness L of the layer in both real and imaginary parts. This is true under the approximations (1) and (2). Important departures from linearity are expected in a configuration in which border effects are important (the parallel plate approximation is good when the edge effects are relatively small). The true dependence can be accurately captured by numerical modeling that can capture both finite size effect and surface curvature effect.

Figure 6:
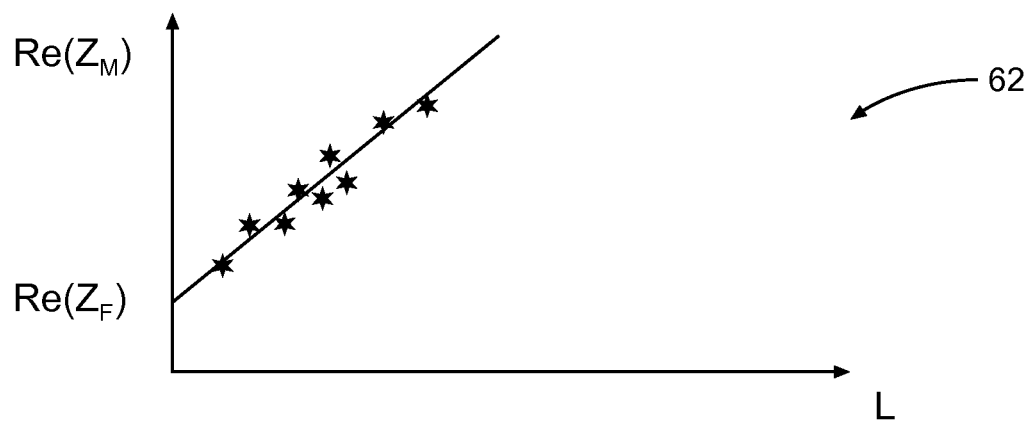
FIG. 6 illustrates a real and an imaginary plot of the effect of mud layer on tool measurements, according to various embodiments.
Figure 6:
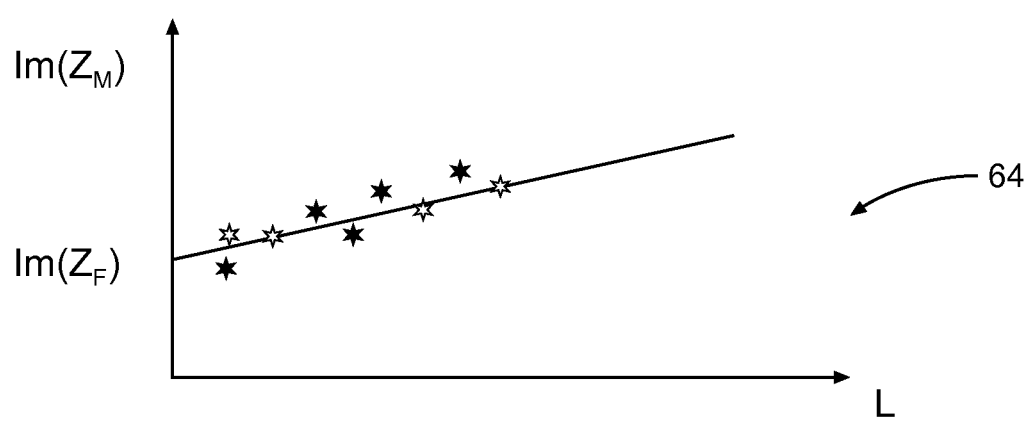

FIG. 6 illustrates a real plot 62 and an imaginary plot 64 of the effect of mud layer on tool measurements, according to various embodiments. As shown, real plot 62 and imaginary plot 64 illustrate that the measured impedance is linearly dependent on the mud layer thickness L, as discussed in relation to equation (6). An accurate modeling of the dependence for various mud layer thicknesses would depart for the linear behavior. Plot 62 illustrates the real part (Re) of the measured impedance (e.g., ohms Ω) on the y-axis and the mud layer thickness (L) on the x-axis. Plot 64 illustrates the imaginary (Im) part of the measured impedance on the y-axis and the mud layer thickness (L) on the x-axis. As shown in plots 62 and 64, the slope for each set of real and imaginary parts is determined, in an example. When the mud thickness L is known for at least one of the measurement points, then the intersection with the axes is determined to provide the real impedance part, $Re(Z_F)$, and the imaginary impedance part, $Im(Z_F)$.

In various examples, the effect of permittivity of the formation can be neglected. In such examples, $Im(Z_F)=0$ and the imaginary part of equation (6) is used to solve for the mud thickness L of a given measurement. Then plot 62, illustrating the real portion of the impedance, can be used to obtain the $Re(Z_F)$. From this, the resistivity of the formation can be obtained, such as by an inversion operation based on forward modeling or a pre-computed database. In one or more examples, an acoustic caliper is used to provide the value of the standoff or mud thickness L and from that the $Re(Z_F)$ is obtained.

In one or more examples, single frequency or multi-frequency measurements are taken by the imaging tool sensor. In various examples, multi-frequency measurements use similar equations to solve for larger unknowns, which are understood by those of ordinary skill in the art.

Figure 7:
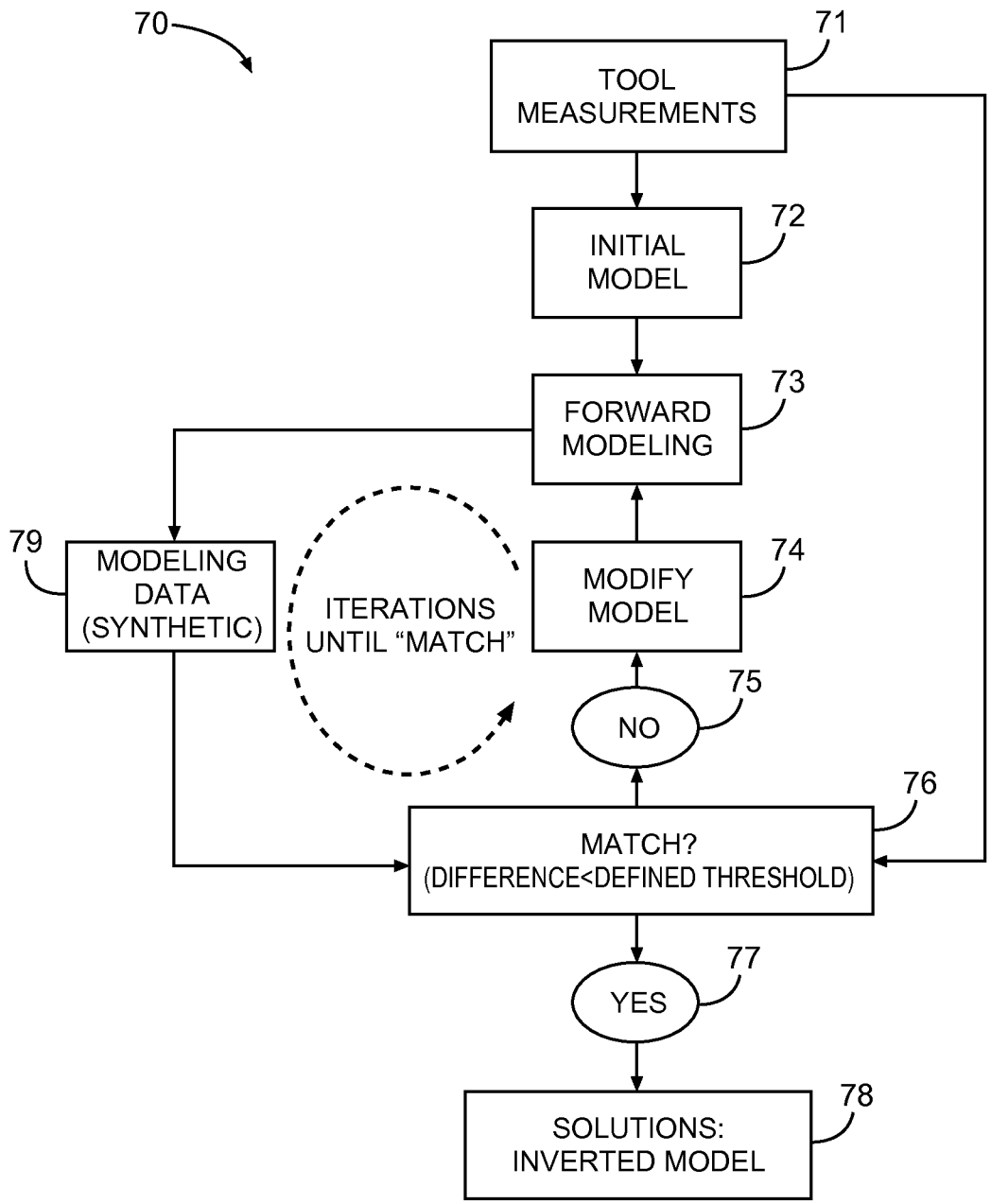
FIG. 7 illustrates a flow diagram of a method for evaluating mud effect in imaging tool multi-frequency measurement, according to various embodiments.

FIG. 7 illustrates a flow diagram of a method 70 for evaluating mud effect in imaging tool multi-frequency measurement, according to various embodiments. As described herein, the method 70 illustrates an inversion method to derive the parameter of the formation, such as permittivity and resistivity. The inversion is applied to the measurement set of each cell, such that a different inversion problem is solved at each cell. For example, the method 70 outlines the dependence of the formation impedance on the resistivity and dielectric permittivity parameters and the dependence of mud layer impedance on the mud layer parameters and the standoff distance (e.g., mud layer thickness). As described herein, relative changes of the imaging tool sensor in the borehole during rotation of the mandrel are determined by logging while drilling (LWD) sensors (e.g., motion sensors). The distance between the sensor (e.g., electrode) and the formation surface affects the imaging sensor measurements, as described herein. Because the sensor takes more than one measurement at a given location (e.g., cell) at the same azimuth position, but each measurement has a different standoff distance, the measurements are analyzed to determine the correct effect of the mud layer. For example, at a time of t(0) the tool imaging sensor takes one measurement M(t0), wherein the standoff is SD(t0). At a time t(1) the imaging tool rotates approximately 360 degrees to the same azimuth position and the sensor takes another measurement M(t1) and the corresponding standoff is SD(t1). Idealistically, SD(t0) is approximately equal to SD(t1) and measurement M(t0) is approximately equal to M(t1). However, due to a number of factors, including tool/mandrel vibration, the measurements may be different. For each measurement, M(t0) and M(t1), the motion sensors determine a difference between SD(t0) and SD(t1). Consequently, according to the present method, measurements M(t1) and M(t0) are used to evaluate the mud effect (e.g., standoff distance effect) due to the same formation properties and mud properties. The only difference being the two measurements having a different standoff distance.

As shown in FIG. 7, the method 70 includes taking imaging measurements while the imaging tool sensor is rotating about the borehole, at 71. The measurements (M), in an example, are more than one signal due to different operating frequencies. As described herein, the measurements (M) are complex measurements having both real and imaginary parts. Then, measurements (M) having the same tool azimuth position are gathered together (e.g., associated) and an initial model is developed, at 72. In an example, the initial model is provided by a user or is a default model. Due to motion sensors the relative position change between M(t0), M(t1), . . . M(tN) is determined and provided in real time. As such, any measurement, for example M(t0) is capable of being taken as a reference relative to other measurements, as is the standoff distance associated with the reference measurement. Based on the relative changes, a forward modeling, at 73, is developed to determine a model for future measurements (e.g., M(t+1)), such as at multiple frequencies. The forward model is compared to other measurements within the measurement set or future measurements, at 75. If the model does not correlate with the related measurements of the measurement set or the future measurements, at 76, according the forward model, then the model is modified, at 74, such as by an iterative process. For example, a factor of the initial model is modified to better correlate with the realized measurements. A factor includes, but is not limited to, a formation property, the standoff distance, or a mud property. In an example, the forward model and the future/related measurement are said to correlate when they are within about 5% or less, about 3% or less, about 1% or less, about 0.5% or less, about 0.1% or less, about 0.01% or less, or about 0.001% or less. When the model and the subsequent measurements correlate, at 77, an inverted model is developed, at 78, for subsequent measurements which accurately takes into account the mud effect on the imaging tool sensor. In an example, the method 70 includes modeling synthetic data, at 88, so as to model potential future measurements or apply to previous/historical measurements. The method 70 is repeated, such as at predetermined differential thresholds, time intervals, or measurement threshold, to maintain the accuracy of the model. The method can also be applied as post processing, in which case the inversion goal is to find the best match for the entire set of measurements.

Figure 8:
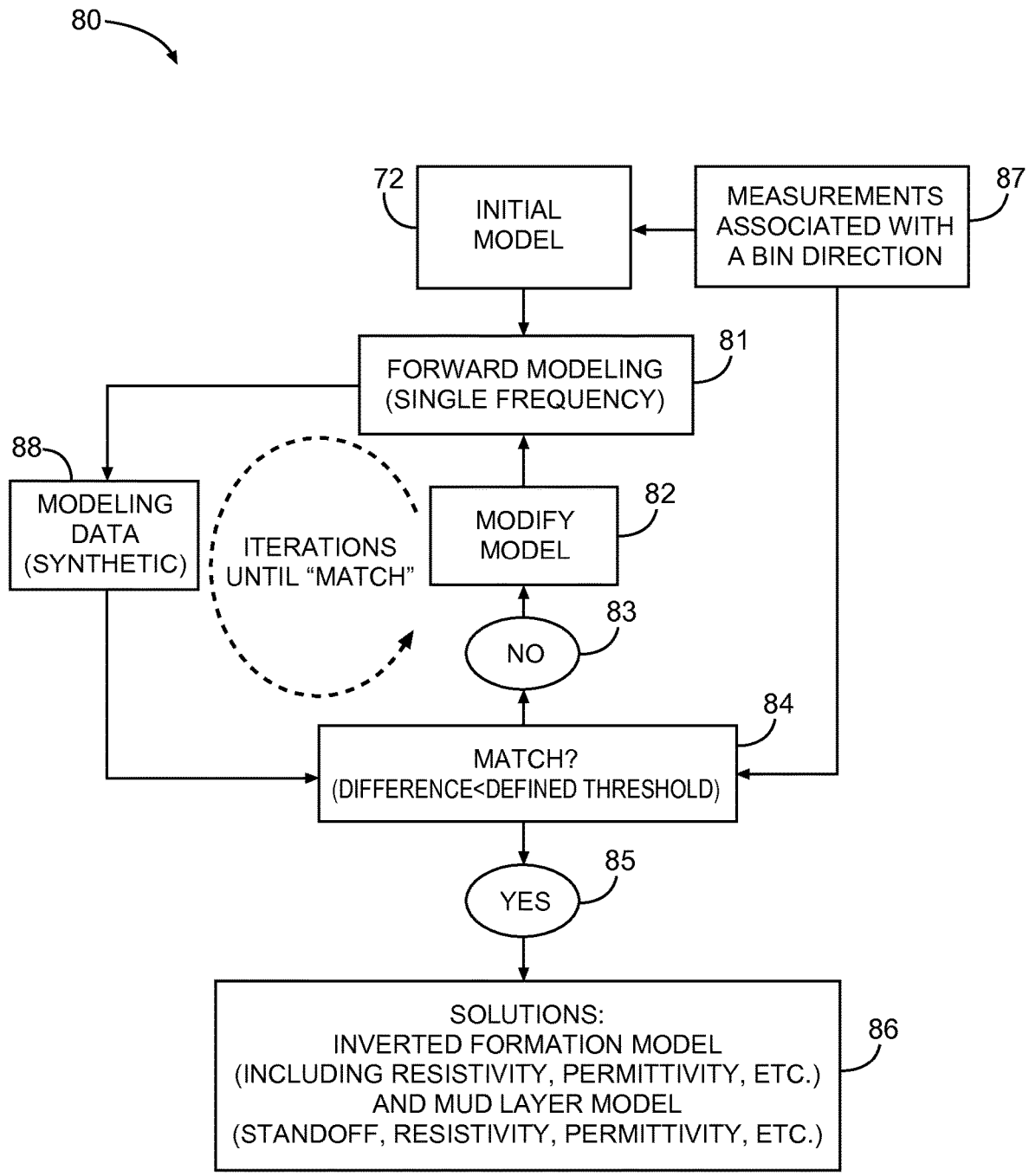
FIG. 8 illustrates a flow diagram of a method for evaluating mud effect in imaging tool single frequency measurement, according to various embodiments.

FIG. 8 illustrates a flow diagram of a method 80 for evaluating mud effect in imaging tool single frequency measurement, according to various embodiments. The method 80 includes using an initial model, such as the initial model developed in relation to FIG. 7, at 72. From the initial model a forward model is developed for the measurements taken at a single frequency, at 81. The method 80 then follows a similar path to that of the model 70. For example, the forward model is compared to other measurements within the measurement set or future measurements, at 83. If the model does not correlate with the related measurements of the measurement set or the future measurements, at 84, according the forward model, then the model is modified, at 82, such as by an iterative process. When the model and the subsequent measurements correlate, at 83, an inverted model is developed, at 83, for subsequent measurements which accurately takes into account the mud effect on the imaging tool sensor. An inverted formation model and a mud layer model, in an example, are developed as two separate models or are combined into a single model. In an example, the method 80 includes modeling synthetic data, at 88, so as to model potential future measurements or apply to previous/historical measurements. The method 80 is repeated, such as at predetermined differential thresholds, time intervals, or measurement threshold, to maintain the accuracy of the model. The method can also be applied as post processing, in which case the inversion goal is to find the best match for the entire set of measurements.

Figure 9:
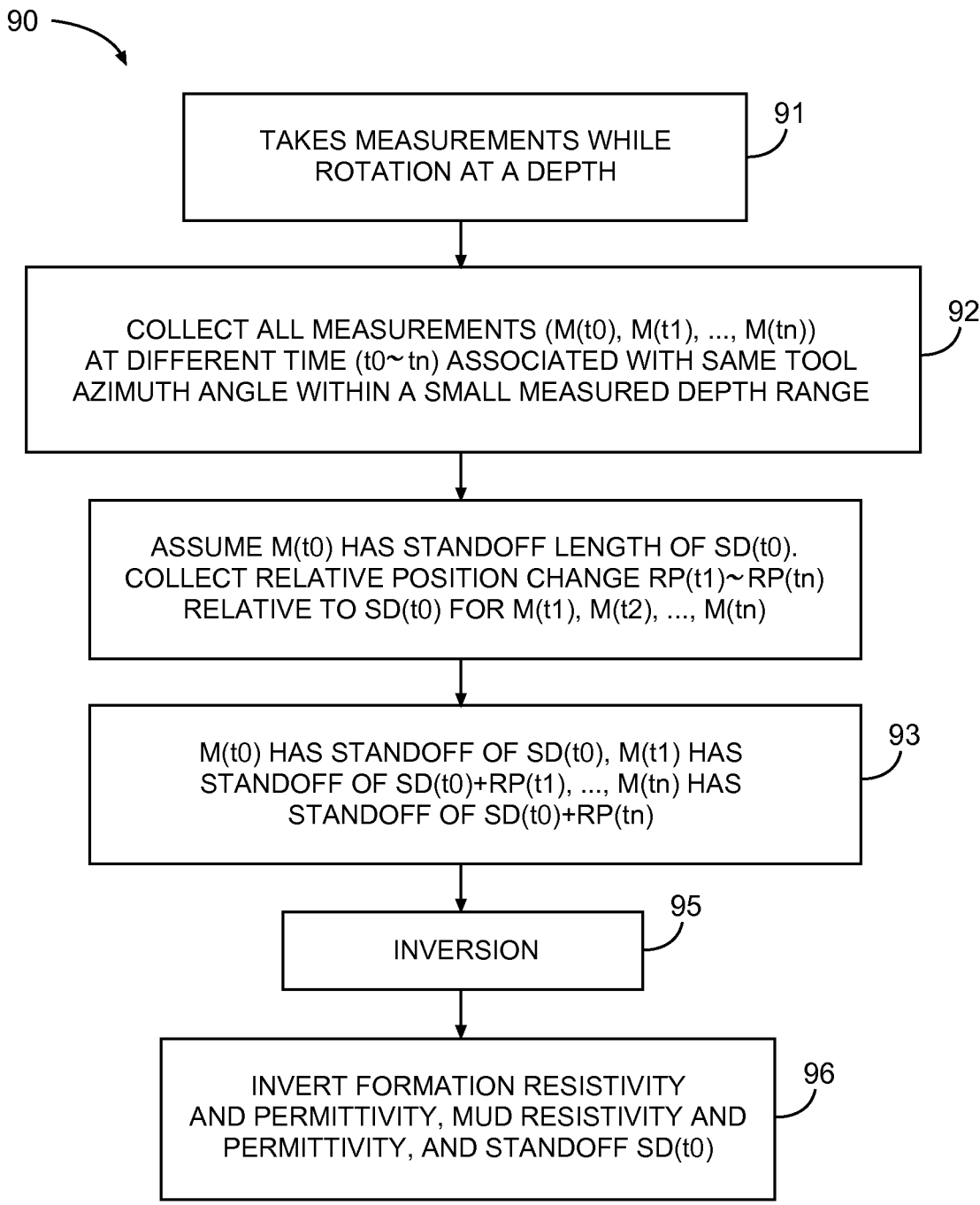
FIG. 9 illustrates a flow diagram of a method for evaluating mud effect in imaging tool measurement, according to various embodiments.

FIG. 9 illustrates a flow diagram of a method 90 for evaluating mud effect in imaging tool measurement, according to various embodiments. The method 90 includes taking a plurality of measurements while the imaging tool sensor rotates about the borehole at a given depth, at 91. At 92, a portion of the plurality of measurements taken at different times (e.g., M(t0), M(t1), . . . , M(tN)) are collected that are associated with the same azimuth position within a depth range. The depth range, in an example, is substantially equal to a diameter of the electrode, a predetermined range (e.g., 1 inch), or other factor. At 93, the method 90 includes assuming a reference measurement, such as M(t0), has a standoff length SD(t0). Based on the reference measurement, a relative position change for each of the remaining collected measurements is determined. The method 90 includes establishing the standoff length for each of the remaining collected measurements based on the SD(t0)+the relative position change at each respective time (e.g., RP(t1), . . . RP(tN)), at 94. The established standoff lengths from 94 are used to perform an inversion forward model for subsequent measurements, at 95. In an example, the inversion forward model is similar to the method outlined in reference to FIGS. 7-8. At 96, the inversion forward model is used to determine formation properties, such as formation resistivity and permittivity, mud properties, such as mud resistivity and permittivity, and standoff SD(t0).

Figure 10:
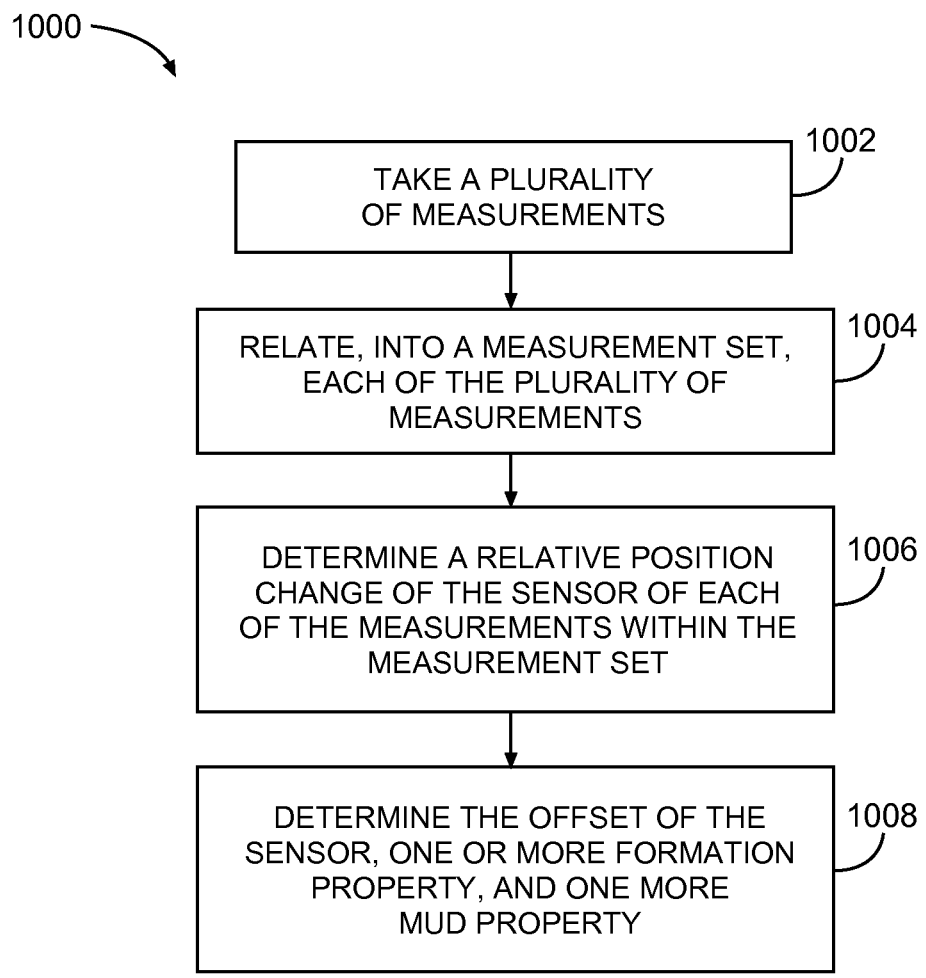
FIG. 10 illustrates a method of evaluating mud effect in imaging tool measurement, according to various embodiments.

FIG. 10 illustrates a method 1000 of evaluating mud effect in imaging tool measurement, according to various embodiments. At 1002, a plurality of measurements are taken, such as by an imaging tool sensor, as described herein. A portion of the plurality of measurements are related into a measurement set, at 1004. Each of the plurality of measurements can be related until multiple measurements sets are created which includes the plurality of measurements. At 1006, a relative position change of the sensor is determined for each of the measurements within the measurement set. In one or more examples, the method 1000 includes establishing a reference measurement, so as to provide a relative position change for each measurement relative to the position of the established reference measurement. The method 1000 also includes determining an offset of the sensor, one or more formation property, and one or more mud property for each of the measurements of the measurement set, at 10008.

Figure 11:
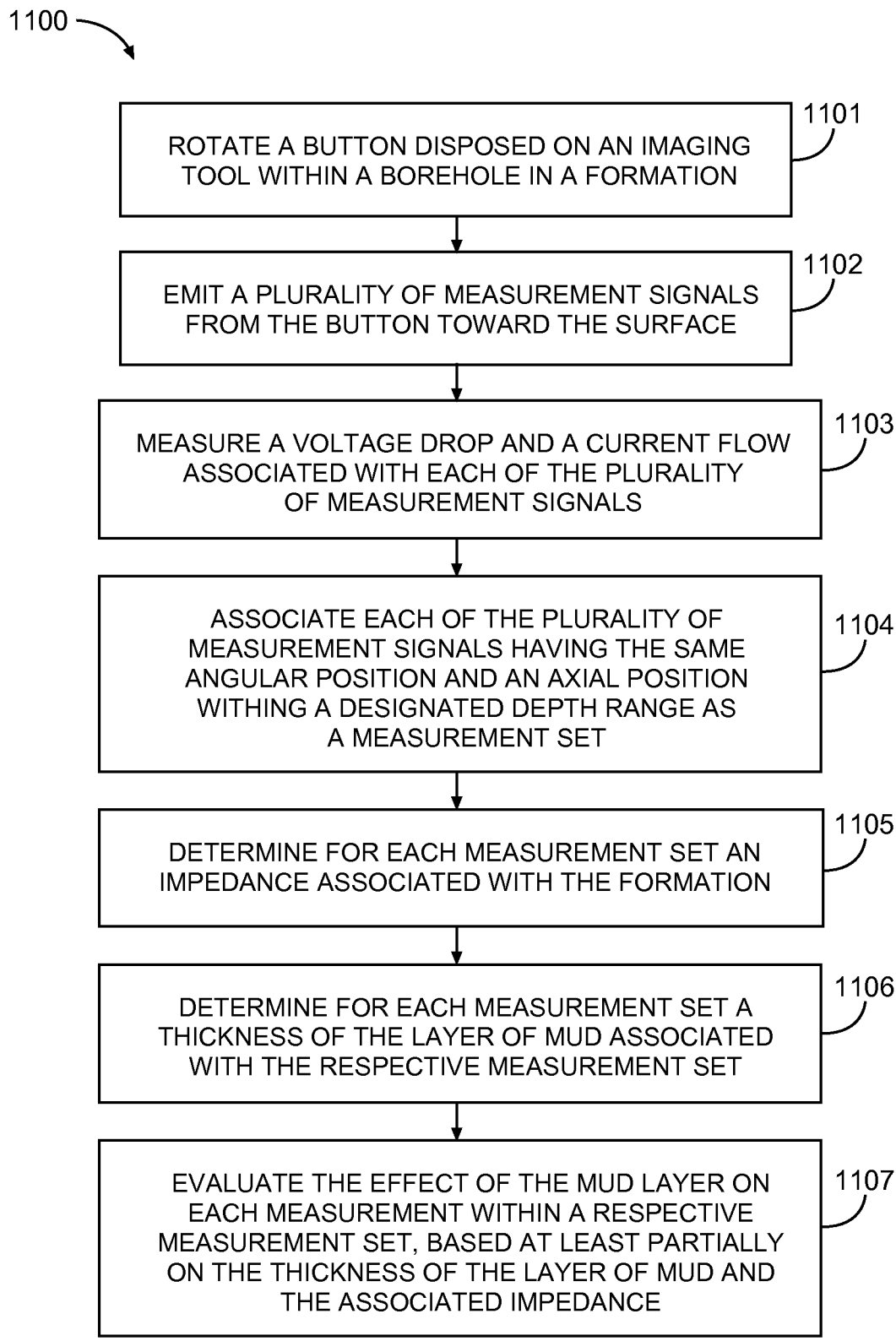
FIG. 11 illustrates a method of evaluating mud effect in imaging tool measurement, according to various embodiments.

FIG. 11 illustrates a method 1100 of evaluating mud effect in imaging tool measurement, according to various embodiments. The method 1100 includes rotating a button disposed on an imaging tool within a borehole in a formation about the borehole, at 1101. As the button is rotated, a plurality of measurement signals are emitted toward a surface of the formation, at 1102, such that the measurement signal permeate the formation. A voltage drop and current flow associated with the emitted measurement signals, at 1103. Each of the plurality of measurement signals are associated according to an angular position and axial position of each of the plurality of measurement signals, at 1104. The association can be based on a depth range, as described herein. At 1105, the method 1110 includes determining, for each of the plurality of measurements, an impedance associated with the formation. Further, at 1106 the thickness of the mud layer for each of the plurality of measurements is determined. The method 1100 includes evaluating the effect of the mud layer on each of the plurality of measurements within a measurement set including the associated measurements, at 1107. The evaluation can include a forward modeling inversion operation, as described herein.

Figure 12:
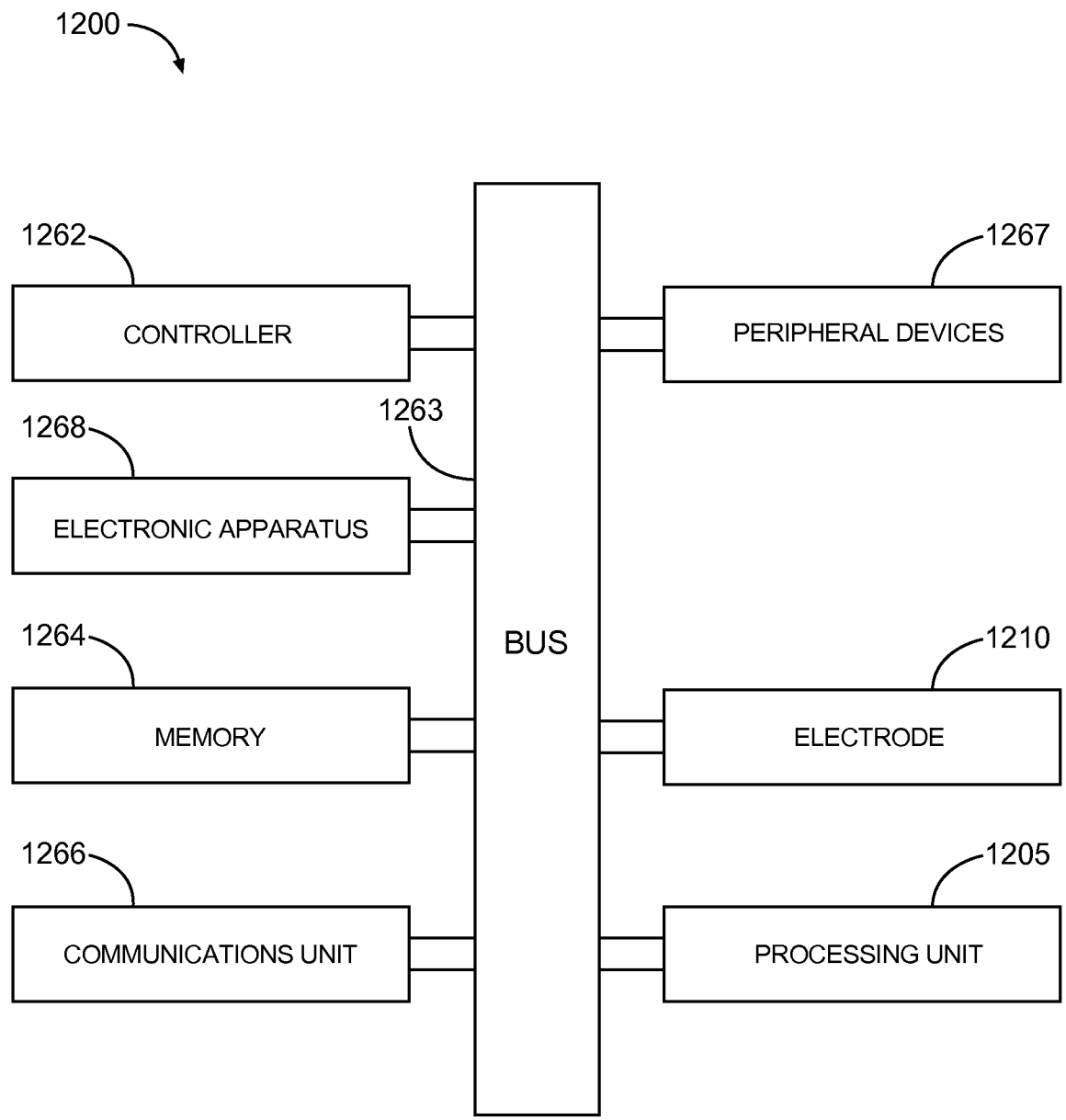
FIG. 12 is a block diagram of an example system for evaluating mud effects in imaging tool measurements, according to various embodiments.

FIG. 12 depicts a block diagram of features of an example system 1200 having a processing unit and a tool to operatively evaluate mud effects in imaging tool measurements. System 1200 includes a processing unit 1205 communicatively coupled to one or more electrode 1210, such as a circular electrode including a button, as described herein. Processing tool measurements provided by the electrode 1210 provides measurements such that the LWD tool can determine geological structural information that takes into account mud effects. An implementation of electrode 1210 can provide an LWD with an arrangement of one or more electrode 1210 tool similar to or in an identical manner to arrangements discussed herein.

The system 1200 can also include a controller 1262, a memory 1264, an electronic apparatus 1268, and a communications unit 1266. Controller 1262, memory 1264, and communications unit 1266 can be arranged to control operation of the LWD tool in a manner similar or identical to a processing unit discussed herein. Various components of system 1200 can operate together as a processing unit to provide control and processing for the LWD tool to process, correlate, associate, model, and evaluate a plurality of measurements from one or more electrode 1210. The controller 1262, memory 1264, and electronic apparatus 1268 can be realized to activate the electrode 1210 in accordance with measurement procedures and signal processing as described herein. Communications unit 1266 can include downhole communications in a drilling operation. Such downhole communications can include a telemetry system.

The system 1200 can also include a bus 1263, where bus 1263 provides electrical conductivity among the components of system 1200. Bus 1263 can include an address bus, a data bus, and a control bus, each independently configured. The bus 1263 can also use common conductive lines for providing one or more of address, data, or control, the use of which can be regulated by controller 1262. Bus 1263 can be configured such that the components of system 1200 are distributed. Such distribution can be arranged between downhole components such as transmitters and receivers of the LWD tool and components that can be disposed on the surface. Alternatively, the components can be co-located such as on one or more collars of a drill string or on a wireline structure.

In various embodiments, peripheral devices 1267 can include displays, additional storage memory, and/or other control devices that may operate in conjunction with controller 1262 and/or memory 1264. In an embodiment, controller 1262 is a processor. Peripheral devices 1267 can be arranged with a display can be used with instructions stored in memory 1264 to implement a user interface to manage the operation of sensor tool 1205 and/or components distributed within system 1200. Such a user interface can be operated in conjunction with communications unit 1266 and bus 1263. Various components of system 1200 can be integrated with the LWD tool such that processing identical to or similar to the processing schemes discussed with respect to various embodiments herein can be performed downhole in the vicinity of the measurement.

The phrase "processor-readable medium" shall be taken to include any tangible non-transitory device which is capable of storing or encoding a sequence of instructions for execution by the machine and that causes the machine to perform any one of the described and/or claimed methodologies. Such a processor-readable medium includes a machine-readable medium or computer readable medium. The term "non-transitory medium" expressly includes all forms of storage devices, including drives (optical, magnetic, etc.) and all forms of memory devices (e.g., Dynamic Random Access Memory (DRAM), Flash (of all storage designs, including NAND or NOR topologies), Static Random Access Memory (SRAM), Magnetic Random Access Memory (MRAM), phase change memory, etc., as well as all other structures designed to store information of any type for later retrieval.

In an electrical context, use of the phrase "coupled" or "coupling" may refer to either direct coupling, such as conductive electrical coupling (e.g., as in the example of excitation currents conductively coupled into a formation), or indirect coupling (e.g., wireless, reactive, or electromagnetic coupling). In the mechanical context, "coupled" or "coupling" may refer to a direct mechanical connection, or an indirect mechanical connection through one or more other mechanical portions of an example.

Figure 13:
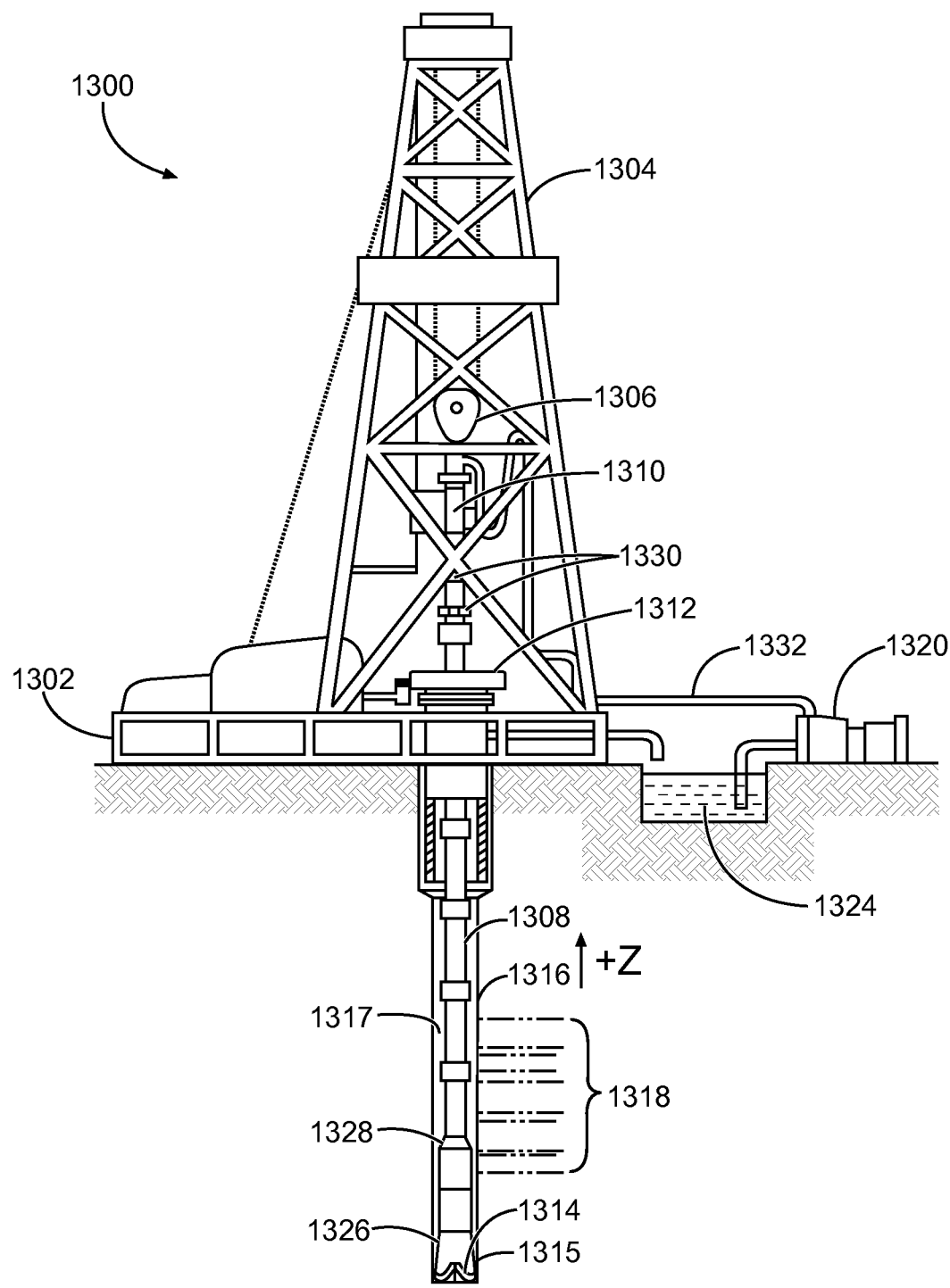
FIG. 13 illustrates a schematic diagram of an example drilling apparatus, such as including a measure-while-drilling (MWD) or log-while-drilling (LWD) capability, according to various embodiments.

FIG. 13 illustrates generally an example of a drilling apparatus 1300, such as including a measure-while-drilling (MWD) or log-while-drilling (LWD) capability. The illustrative example of FIG. 13 may include apparatus such as shown in FIGS. 1-3, or may be used with techniques discussed in relation to FIGS. 7-11. A drilling rig or platform 1302 generally includes a derrick 1304 or other supporting structure, such as including or coupled to a hoist 1306. The hoist 1306 may be used for raising or lowering equipment or other apparatus such as drill string 1308. The drill string 1308 may access a borehole 1316, such as through a well head 1312. The lower end of the drill string 1308 may include various apparatus, such as a drill head 1314, such as to provide the borehole 1316.

A drilling fluid or "mud" 1317 may be circulated in the annular region around the drill head 1314 or elsewhere, such as provided to the borehole 1316 through a supply pipe 1322, circulated by a pump 1320, and returning to the surface to be captured in a retention pit 1324 or sump. Various subs or tool assemblies may be located along the drill string 1308, such as include a bottom hole assembly (BHA) 1326 or a second sub 1328.

As the BHA 1326 or second sub 1328 pass through various regions of a formation 1318, information may be obtained. For example, the BHA 1326, or the second sub 1328, may include a sensor 1315 (e.g., a button, an electrode, as described herein) such as shown in the examples of FIGS. 1-3, such as to evaluate the formation including any mud effects. The second sub 1328 may include wireless telemetry or logging capabilities, or both, such as to transmit or later provide information indicative of a formation resistivity to operators on the surface or for later access in evaluation of formation 1318 properties, including depth. For example, portions 1330 of the apparatus 1300 at the surface may include one or more of wireless telemetry, processor circuitry, or memory facilities, such as to support log-while-drilling (LWD) or measurement-while-drilling (MWD) operations.

Figure 14:
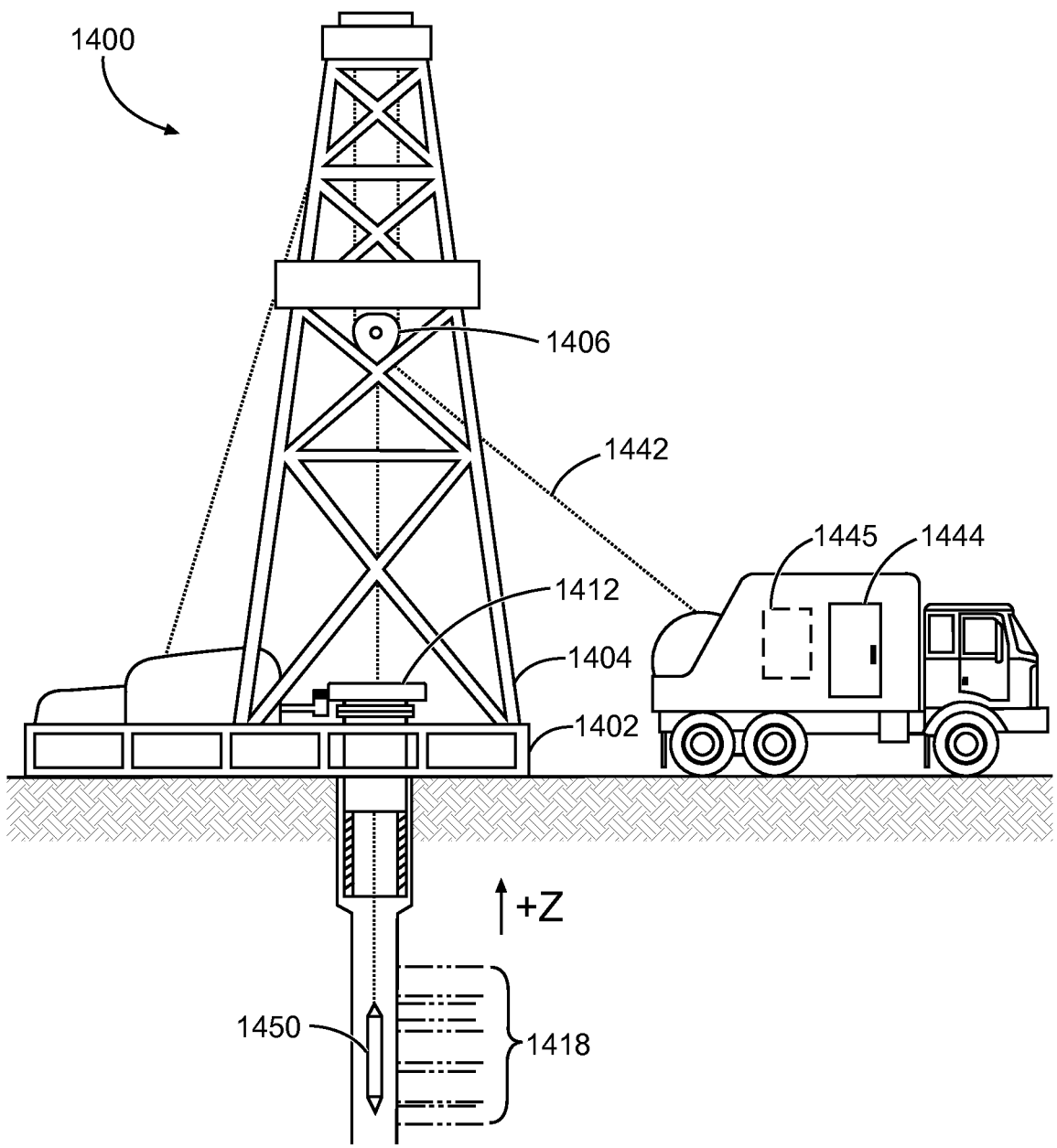
FIG. 14 illustrates a schematic diagram of an example wireline logging apparatus, according to various embodiments.

FIG. 14 illustrates generally an example of a wireline logging apparatus. The illustrative example of FIG. 14 may include a sensor such as shown in FIGS. 1-3, or may be used with techniques discussed in relation to FIGS. 7-11. Similar to the example of FIG. 13, a hoist 1406 may be included as a portion of a platform 1402, such as coupled to a derrick 1404, and used to raise or lower equipment such as a wireline sonde 1450 into or out of a borehole. In this wireline example, a cable 1442 may provide a communicative coupling between a logging facility 1444 (e.g., including a processor circuit 1445 or other storage or control circuitry) and the sonde 1450. In this manner, information about the formation 1418 may be obtained, such as using an array log tool included as at least a portion of the sonde 1450 as discussed in other examples herein. In other examples, such as in slickline or coiled tubing conveyed apparatus, the cable 1442 may not provide communicative coupling. Rather, data for logging may be stored in a downhole memory (not shown), which is subsequently retrieved and processed at the surface.

For purposes of illustration, the examples of FIGS. 13 and 14 show a vertically-oriented borehole configuration. However, the apparatus and techniques described herein may also be used in other borehole configurations, such as a borehole including a horizontal penetration direction, or an oblique borehole configuration, for example. The examples of FIGS. 13 and 14 also generally illustrate land-based examples. But, apparatus and techniques described herein may be used in offshore environments as well, such as for subsea operations. In particular, offshore or subsea operations may include use of wireline or LWD/MWD apparatus and techniques including aspects of the examples herein.

To better illustrate the methods and articles for evaluating mud effects in imaging tool measurement disclosed herein, a non-limiting list of examples is provided:

Example 1 can include a method for evaluating formation and mud parameters, comprising: taking a plurality of measurements with a sensor positioned down a borehole, the sensor being offset from a wall of the formation by a layer of mud, each measurement having an associated azimuth angle and depth; relating, into a measurement set, each of the plurality of measurements having the same azimuth angle and depth within a designated depth range; determining, with a motion sensor, a relative radial position change of the sensor of each of the measurements within the measurement set; accumulating at least one formation characteristic within the measurement set corresponding to the relative radial position changes; and determining for at least one measurement of each measurement set the offset of the sensor, one or more formation property, and one or more mud property.

Example 2 can include, or can optionally be combined with the subject matter of Example 1, further comprising establishing an initial model for determining the standoff of the sensor, the one or more formation property, and the one or more mud property for related measurements within the measurement set of the at least one measurement and subsequent measurements, wherein the initial model includes the determined offset of the sensor, the one or more formation property, and the one or more mud property of the at least one measurement.

Example 3 can include, or can optionally be combined with the subject matter of one or any combination of Examples 1-2, wherein the initial model is user provided.

Example 4 can include, or can optionally be combined with the subject matter of one or any combination of Examples 1-3, wherein the initial model is established from a first portion of the plurality of measurements.

Example 5 can include, or can optionally be combined with the subject matter of one or any combination of Examples 1-4, further comprising, for each measurement set including the plurality of measurements having the same azimuth angle and depth within the designated depth range: forward modeling, for each measurement set, with the established initial model to generate corresponding modeling responses, the corresponding modeling responses being associated to a measurement of the plurality of measurements within the relative measurement set; and comparing the corresponding modeling responses with the associated measurements to determine a difference.

Example 6 can include, or can optionally be combined with the subject matter of one or any combination of Examples 1-5, further comprising adjusting at least one factor in the initial model, if the difference is greater than a defined threshold, wherein the at least one factor is selected from the group consisting of: the standoff distance of the sensor, one or more formation property, and one or more mud property Example 7 can include, or can optionally be combined with the subject matter of one or any combination of Examples 1-6, wherein taking the plurality of measurements includes taking the plurality of measurements at single frequency or multiple frequencies.

Example 8 can include, or can optionally be combined with the subject matter of one or any combination of Examples 1-7, wherein the one or more formation property includes formation permittivity and formation resistivity and the one or more mud property includes mud permittivity and mud resistivity.

Example 9 can include, or can optionally be combined with the subject matter of one or any combination of Examples 1-8, further comprising rotating the sensor circumferentially about the borehole.

Example 10 can include, or can optionally be combined with the subject matter of one or any combination of Examples 1-9, wherein the motion sensor is at least one of an accelerometer and a magnetometer, and relative radial position change is determined from a reference point of the sensor, the depth, or a user defined coordinate.

Example 11 can include a method for evaluating mud effect, comprising: rotating a button disposed on an imaging tool within a borehole in a formation, the button being offset from a surface of the formation and a layer of mud being disposed between the button and the surface; emitting a plurality of measurement signals from the button toward the surface, each of the plurality of measurement signals having an angular position and an axial position; measuring a voltage drop and a current flow to determine each of the plurality of measurement signals; associating each of the plurality of measurement signals having an angular position and an axial position within a designated angular range and a designated depth range as a measurement set; accumulating at least one formation characteristic for the measurement set; determining, with a motion sensor, a relative position change of each measurement of the measurement set; decoupling an effect of the thickness of the layer of mud from the at least one formation characteristic within the measurement set; and determining at least one formation property from the decoupled formation characteristic.

Example 12 can include, or can optionally be combined with the subject matter of Example 11, further comprising determining a formation resistivity and a formation permittivity of the formation.

Example 13 can include, or can optionally be combined with the subject matter of one or any combination of Examples 11-12, wherein evaluating the effect of the mud layer includes determining a mud resistivity and a mud permittivity of the mud.

Example 14 can include, or can optionally be combined with the subject matter of one or any combination of Examples 11-13, further comprising receiving a return measurement signal at a return electrode disposed on the imaging tool, wherein the voltage drop and the current flow are associated with the return measurement signal as compared to the associated measurement signal.

Example 15 can include, or can optionally be combined with the subject matter of one or any combination of Examples 11-14, further comprising establishing an initial model for determining the thickness of the layer of mud and evaluating the effect of the mud layer within each measurement set, wherein the initial model includes a factor for an offset of the sensor, a factor for one or more formation property, and a factor for one or more mud property of the at least one measurement of the measurement set.

Example 16 can include, or can optionally be combined with the subject matter of one or any combination of Examples 11-15, further comprising: forward modeling with the established initial model to generate corresponding modeling responses; comparing the corresponding modeling responses with corresponding measurements to determine a difference; and adjusting at least one of the factors of the initial model if the difference is greater than a defined threshold.

Example 17 can include, or can optionally be combined with the subject matter of one or any combination of Examples 11-16, wherein evaluating includes numerical modeling the curvature of the borehole.

Example 18 can include, or can optionally be combined with the subject matter of one or any combination of Examples 11-17, wherein the designated angular range and the designated depth range are about equal to or less than a length dimension of the button.

Example 19 can include, or can optionally be combined with the subject matter of one or any combination of Examples 11-18, further comprising using an acoustic caliper.

Example 20 can include, or can optionally be combined with the subject matter of one or any combination of Examples 11-19, wherein the at least one formation characteristic is conductivity of the formation, permittivity of the formation, or is associated with at least one measurement selected from the group consisting of: a current measurement, a voltage measurement, an impedance measurement, and a resistivity measurement.

Example 21 can include an article including a machine-readable medium having instructions stored therein, wherein the instructions, when executed, result in a machine performing: determining a standoff of a sensor, one or more formation property, and one or more mud property based on a plurality of measurements taken by the sensor at a depth down a borehole, the plurality of measurements associated by an azimuthal angle and a depth range.

Example 22 can include, or can optionally be combined with the subject matter of Example 21, wherein the instructions, when executed, result in a machine further performing: forward modeling based on an initial model to generate corresponding modeling responses; comparing the corresponding modeling responses with corresponding measurements to determine a difference; and adjusting the initial model if the difference is greater than a defined threshold.

Example 23 can include, or can optionally be combined with any portion or combination of portions of any one or more of Examples 1-35 to include, subject matter of the present method and article for evaluating mud effect.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The embodiments are submitted with the understanding that they will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for evaluating formation and mud parameters, comprising:
    taking a plurality of measurements with a sensor positioned down a borehole, the sensor being offset from a wall of the formation by a layer of mud, each measurement having an associated azimuth angle and depth;
    relating, into each of one or more measurement sets, a plurality of measurements having a same azimuth angle within a designated depth range;
    for each of the one or more measurement sets,
        determining, using a motion sensor, a relative radial position change of the sensor corresponding to each of the measurements; and
        accumulating at least one formation characteristic within the measurement set corresponding to the relative radial position changes; and
    determining for at least one measurement of each measurement set an offset of the sensor from a formation wall, one or more formation property, and one or more mud property.

2. The method of claim 1, further comprising establishing an initial model for determining the offset of the sensor, the one or more formation property, and the one or more mud property for related measurements within the measurement set of the at least one measurement and subsequent measurements, wherein the initial model includes the determined offset of the sensor, the one or more formation property, and the one or more mud property of the at least one measurement.

3. The method of claim 2, wherein the initial model is user provided.

4. The method of claim 2, wherein the initial model is established from a first portion of the plurality of measurements.

5. The method of claim 2, further comprising, for each measurement set:
    forward modeling using the initial model to generate corresponding modeling responses, each of the corresponding modeling responses being associated with a respective one of the plurality of measurements within the measurement set; and
    comparing the corresponding modeling responses with the associated measurements to determine a difference.

6. The method of claim 5, further comprising adjusting at least one factor in the initial model if the difference is greater than a defined threshold, wherein the at least one factor is selected from the group consisting of: the offset of the sensor, one or more formation property, and one or more mud property.

7. The method of claim 1, wherein taking the plurality of measurements includes taking the plurality of measurements at single frequency or multiple frequencies.

8. The method of claim 1, wherein the one or more formation property includes formation permittivity and formation resistivity and the one or more mud property includes mud permittivity and mud resistivity.

9. The method of claim 1, further comprising rotating the sensor circumferentially about the borehole during said taking a plurality of measurements.

10. The method of claim 1, wherein the motion sensor is at least one of an accelerometer and a magnetometer, and relative radial position change is determined from a reference point of the sensor, the depth, or a user defined coordinate.

11. A method for evaluating mud effect, comprising:
rotating a button disposed on an imaging tool within a borehole in a formation, the button being offset from a surface of the formation and a layer of mud being disposed between the button and the surface;
emitting a plurality of measurement signals from the button toward the surface, each of the plurality of measurement signals having an angular position and an axial position;
measuring a voltage drop and a current flow to determine each of the plurality of measurement signals;
grouping each of the plurality of measurement signals into a respective one or one or more measurement sets of measurement signals each having an angular position and an axial position within a designated angular range and a designated depth range;
for each of the measurement sets,
  accumulating at least one formation characteristic; and
  determining, using a motion sensor, relative radial position changes of the measurements of the measurement signals;
decoupling an effect of a thickness of the layer of mud from the at least one formation characteristic within at least one of the measurement sets; and
determining at least one formation property from the decoupled formation characteristic.

12. The method of claim 11, further comprising determining a formation resistivity and a formation permittivity of the formation.

13. The method of claim 11, further comprising evaluating an effect of the mud layer including determining a mud resistivity and a mud permittivity of the mud.

14. The method of claim 11, further comprising receiving a return measurement signal at a return electrode disposed on the imaging tool, wherein the voltage drop and the current flow are associated with the return measurement signal as compared to a measurement signal associated with the return measurement signal.

15. The method of claim 11, further comprising establishing an initial model for determining the thickness of the layer of mud and evaluating the effect of the mud layer within each measurement set, wherein the initial model includes a factor for an offset of the sensor from a formation wall, a factor for one or more formation property, and a factor for one or more mud property of the at least one measurement of the measurement set.

16. The method of claim 15, further comprising:
forward modeling with the established initial model to generate corresponding modeling responses; and
comparing the corresponding modeling responses with corresponding measurements to determine a difference.

17. The method of claim 11, wherein evaluating includes numerically modeling a curvature of the borehole.

18. The method of claim 11, wherein the designated angular range and the designated depth range are equal to or less than a length dimension of the button.

19. The method of claim 11, further comprising determining a thickness of the layer of mud using an acoustic caliper.

20. The method of claim 11, wherein the at least one formation characteristic is conductivity of the formation, permittivity of the formation, or is associated with at least one measurement selected from the group consisting of: a current measurement, a voltage measurement, an impedance measurement, and a resistivity measurement.

21. An article including a machine-readable medium having instructions stored therein, wherein the instructions, when executed, result in a machine performing:
determining a standoff of a sensor, one or more formation property, and one or more mud property based on a plurality of measurements taken by the sensor at a depth down a borehole, the plurality of measurements associated by an azimuthal angle and a depth range;
forward modeling based on an initial model to generate corresponding modeling responses;
comparing the corresponding modeling responses with corresponding measurements to determine a difference; and
adjusting the initial model if the difference is greater than a defined threshold.

22. The method of claim 16, further comprising adjusting at least one of the factors of the initial model if the difference is greater than a defined threshold.

* * * * *